HUMAN VOICE RECOGNITION DEVICE

Filed March 28, 1966

INVENTOR.
Edward Della Torre
BY
Eli Weiss
ATTORNEY

July 15, 1969 E. D. TORRE 3,456,080

HUMAN VOICE RECOGNITION DEVICE

Filed March 28, 1966 3 Sheets-Sheet 2

United States Patent Office 3,456,080
Patented July 15, 1969

3,456,080

HUMAN VOICE RECOGNITION DEVICE

Edward Della Torre, Somerville, N.J., assignor to American Standard Inc., New York, N.Y., a corporation of Delaware Filed Mar. 28, 1966, Ser. No. 537,963
Int. Cl. H04m 1/00
U.S. Cl. 179—1 5 Claims

ABSTRACT OF THE DISCLOSURE

Covers a speech recognition apparatus. Major peak burst pulses attributable to the larynx of the speaker are received in electrical form and a peak detector delivers only electrical signals exceeding the threshold amplitude. Pulse type signals corresponding to the major peak burst pulses are converted to direct current signals which are related to the repetition rate of said major burst pulses.

This invention relates to devices for recognizing human voices, especially by spoken word. Such devices are useful in analyzing, classifying, and indexing human voice signals, and serve for recognition purposes in a manner similar to photographs or finger prints.

Recognition of the person by his own peculiar speech characteristics is highly useful, because in a sense retrieval of the indexed information is greatly facilitated by the relative ease of classification. The criterion for classification is the repetition rate at which the larynx produces sound bursts. The repetition rate varies from 70 to 400 cycles per second, and on the basis of this frequency classification it is possible to indicate that the speaker is male or female, whether inflections are used by the speaker or whether the speaker is singing or speaking. The rate of production of larynx sound bursts will hereinafter be also referred to as the "pitch" frequency, and in this sense the device of the invention may be deemed to be a pitch frequency detector.

Figure 2:
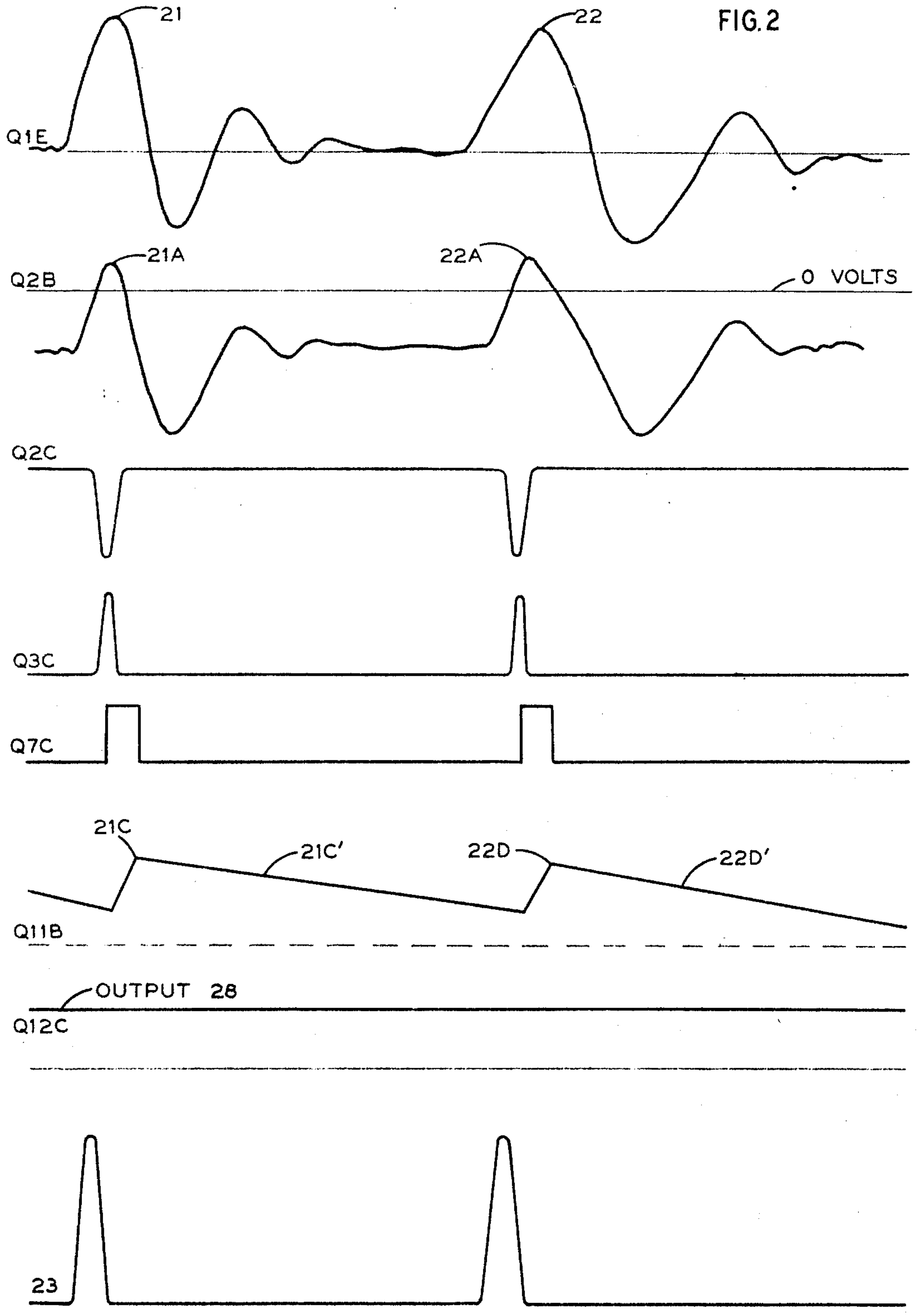

If the pitch frequency were available in the form indicated by waveshape 23 in FIGURE 2, its determination would be a relatively simple matter. Unfortunately, it is not. The sounds produced by the larynx go into resonant cavities in the throat and mouth and convert the pure bursts produced by the larynx into a "ringing" waveshape (see FIGURE 2, waveshape QIE). The major peaks, indicated by reference numerals 21 and 22 in waveshape QIE, correspond to the larynx bursts of waveshape 23. It is a principal object of the present invention to provide apparatus which in essence separates the major peaks from the remainder of the indicated ringing waveshapes and measures the time interval between major peaks and hence their repetition rate, i.e., the pitch frequency.

The measurement of the pitch frequency is complicated by the fact that the pitch frequency range is almost a decade (from 70 to 400 cycles per second) as stated, and that many of the sounds in speech such as "f" and "s" are unvoiced and have no basic periodicity. Furthermore, and as is readily seen by reference to waveshape OIE, the waveform is inherently complicated. Also, time intervals of silence render the problem of separation more difficult.

It is, therefore, another object of the invention to provide a pitch frequency detector, which with high reliability will be effective in separating the minor peaks and unwanted components of the signal waveshape which corresponds to human speech.

A further object of the invention is the provision of a peak detector which is sensitive to the actual peaks with good accuracy, so that the time separation of the actual peaks may be readily determined with good accuracy.

Briefly, the invention contemplates, in speech recognition apparatus, means for separating the major peak burst pulses attributable to the larynx from ringing and other unwanted signals inherent in the human voice, comprising input means for receiving the composite voice signal in electrical form, and a peak locator coupled to the input means and comprising a signal amplifying device operating at a limiting condition of current conduction such that, at its output, are delivered only the signals exceeding a threshold amplitude, namely the desired major-peak-larynx-burst pulses.

Other objects, advantages, and features of the invention will be apparent from the following more detailed description when read with the accompanying drawings.

Figure 1A:
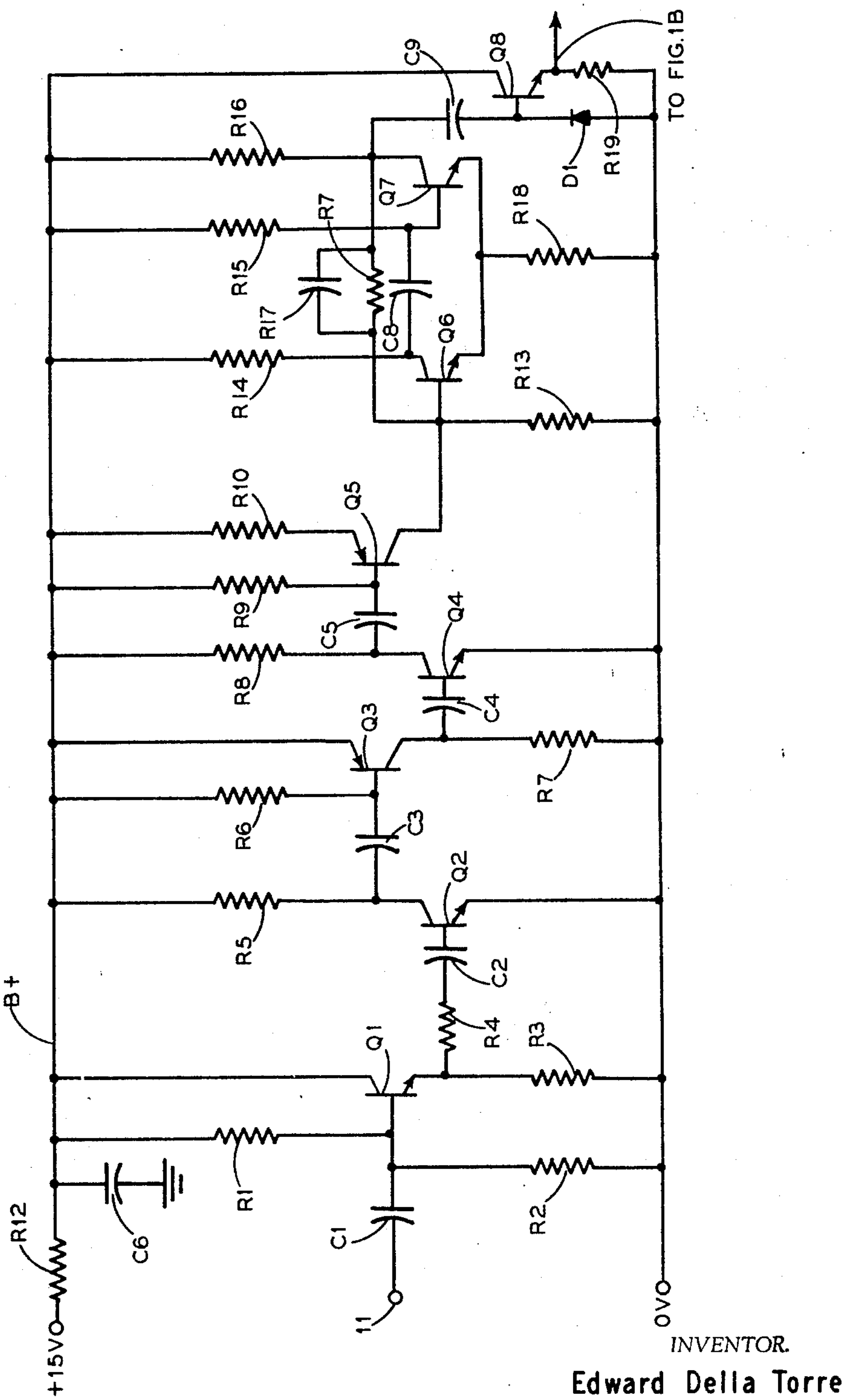
Figure 1B:
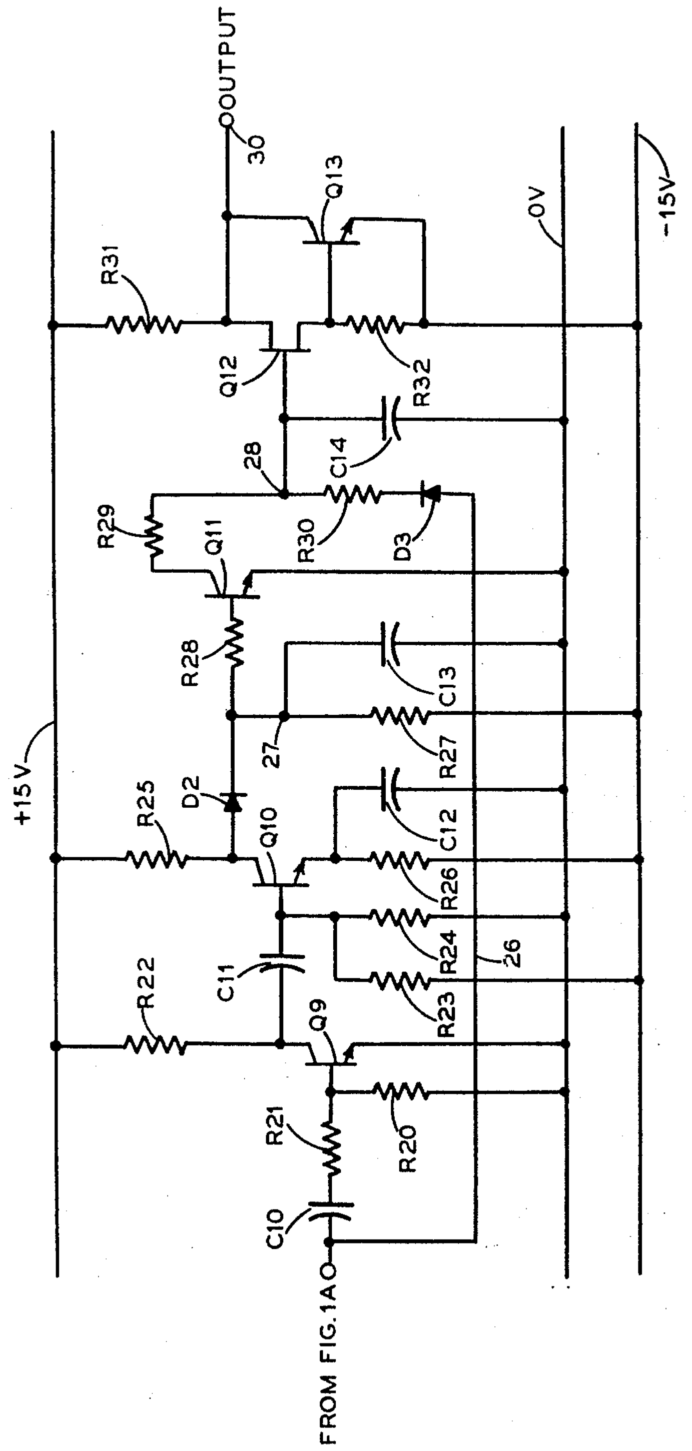

In the drawings:

FIGURES 1A and 1B, considered together, constitute a schematic drawing of a pitch frequency detector in accordance with a preferred embodiment of the invention; and FIGURE 2 is a timing diagram which illustrates the waveshape signals generated by some of the circuit stages illustrated in FIGURES 1A and 1B.

The circuit illustrated in FIGURE 1A is a pulse shaping circuit, whose function it is to separate from the voice input signal (FIGURE 2, waveshape QIE) the major peaks designated by reference numerals 21 and 22, to afford a basis for frequency measurement of the larynx bursts (FIGURE 2, waveshape 23). In FIGURE 2, apart from the true larynx burst waveshape 23, the waveshapes are given legends which correspond to the particular circuit points in FIGURES 1A and 1B, which produce the respective waveshapes. For example, the waveshape QIE implies that this particular waveshape is generated at the emitter of transistor Q1. The suffix letters B, C stand for base and collector, respectively.

By reference to the waveshape Q2C, it is noted that a signal suitable for frequency measurement is available at a relatively early stage, and it is intended to be within the scope of the invention to provide as a minimum a "peak locator" or "peak detector" to separate the major peaks from the "ringing" input. However, for the purpose of providing an integrating or averaging effect to take into account the time intervals of silence, there is provided an integrate and hold circuit, illustrated in FIGURE 1B. In order properly to shape pulses for utilization by the integrate and hold circuit of FIGURE 1B, additional pulse shaping circuitry, following the transistor Q2, is provided in FIGURE 1A.

The circuits of FIGURES 1A and 1B employ the following voltage supply levels: +15 volts; 0 volts (ground); and −15 volts (used in FIGURE 1B only). Additionally, in FIGURE 1A only, there is provided another positive voltage supply level designated as B+, having a value somewhat below +15 volts. The level B+ is obtained from the +15 volt level via a voltage dropping resistor R12, which carries the supply currents drawn by the circuitry of FIGURE 1A. Capacitor C6 serves as a by-pass capacitor for the voltage supply B+. Thus, the level B+ serves as the virtual positive power supply level for the circuitry of FIGURE 1A.

Referring to FIGURE 1A, the "ringing" waveshape signal QIE appears at the emitter follower-connected transistor stage Q1, in consequence of essentially the same waveshape (QIE) being appied to the input terminal 11 and via coupling capacitor C1 to the base of the transistor Q1. Bias at the base of the transistor Q1 is provided by the voltage divider comprising resistors R1 and R2 connected between the B+ and ground voltages.

The voice input applied to terminal 11 may be derived from "live" speech via a microphone or may have been previously recorded on magnetic tape or on some other form of suitable record. It is assumed that any necessary preamplification or suitable voice-to-electrical signal transducers have preceded the input terminal 11.

The signal QIE is transmitted from he emitter of the transistor Q1 via series-connected resistor R4 and coupling capacitor C2 to the base of the transistor Q2, which is connected as grounded emitter amplifier, and functions as a "peak locator." Referring to the waveshape Q2B, it is seen that at the base of the transistor Q2 there is essentially the same waveshape as at the emitter of the transistor Q1. However, the peaks 21A and 22A (corresponding to the peaks 21 and 22) barely rise above zero volts, and the remainder of the original waveshape is below zero volts owing to the action of the base-emitter diode of the transistor Q2 operating as a clamp. The charge lost per cycle in the coupling capacitor C2 is restored at the peak (21A, 22A) of the wave through the clamp diode. This current is multipled by the $\beta$ of the transistor Q2 and appears as a pulse (waveshape Q2C at its collector).

The immediately following stages which incude the transistors Q3, Q4 and Q5 function to narrow futher the pulses derived from the just-described stage involving transistor Q2. The transistor Q3 function as a limiter; the transistor Q4 as a second peak locator, similar to the transistor Q2; and the transistor Q5 as a second limiter, similar to the transistor Q3.

The signal Q2C is coupled to the base of transistor Q3 via capacitor C3, bias being provided at the base of transistor Q3 by resistor R6. The transistor Q3 is a PNP transistor, in contrast to the NPN transistors Q1 and Q2, and is connected as a common-emitter amplifier with its emitter connected to voltage supply B+, and its collector connected via output signal developing resistor R7 to ground. The transistor Q3 functions as a limiter. The pulses in its output waveshape Q3C are a narrower and inverted version of the pulses contained in the waveshape Q2C, owing to the limiting action ofthe transistor Q3, which is brought about by the relatively large magnitude signal applied to its base. The signal Q3C is further shaped by the circuits including the transistors Q4 and Q5, which are structurally and functionally similar to the circuits including the transistors Q2 and Q3, respectively, and are therefore not described in detail, except in the following respect. The emitter of the transistor Q5 is couped to the voltage supply B+ through a relatively small (150 ohm) voltage dropping resistor R10 rather than being conductor-connected thereto as was the case for the transistor Q3.

The collector of the transistor Q5 is directly connected to the base of transistor Q6, which together with the transistor Q7 forms a one-shot or monostable multivibrator. Thus, the transistor Q5 functions additionally as a driver stage for the multivibrator.

Coupling between the transistors Q6 and Q7 is provided by the common emitter resistor R18 as well as by the indicated cross-coupling connections, capacitor C8 on the one hand, and paralleled resistor R17 and capacitor C7 on the other. The transistor Q6 is normally non-conducting, and the transistor Q7 normally conducting. The multivibrator produces a one millisecond output pulse (waveshape Q7C), which is coupled via capacitor C9 to the base of transistor Q8 connected as an emitter-follower amplifier. The diode D1, connected from the base of transistor Q8 to ground, and polarized, as shown, operates as a DC restorer. The output at the emitter of the transistor Q8 is essentially a replica of the waveshape Q7C.

The output of the emitter-follower transistor Q8 is fed via a charge path and a discharge path in parallel to capacitor C14 (FIGURE 1B) whose output voltage is an indication of the pitch frequency. The charge path comprises line 26, diode D3 and resistor R30. The discharge path comprises the serially connected transistor amplifiers Q9, Q10 and Q11.

With respect to the discharge path, the output signal of the emitter-follower transistor Q8 is applied via series connected coupling capacitor C10 and resistor R21 to the base of transistor Q9, a grounded emitter voltage amplifier. The circuits associated with the transistor Q9 and its following transistor Q10 constitute a two-stage voltage amplifier of essentially conventional design. Both stages are grounded emitter amplifiers, for signal purposes, even the transistor Q10, since the capacitor C12 serves as a bypass capacitor from the emitter of transistor Q10 to ground. Base bias is provided by resistor R20 for the transistor Q9 and by the resistors R23 and R24 for the transistor Q10. Emitter resistor R26 also provides a certain amount of bias for the transistor Q10. Amplified output voltage is developed at the respective collectors, the resistor R22 serving as collector load resistor for the transistor Q9 and the resistor R25 for the transistor Q10. Coupling capacitor C11 connects the collector of transistor Q9 to the base of transistor Q10. The output signals developed at the collectors of transistors Q9 and Q10 represent successive amplified versions of the signal Q7C.

The output signal from the collector of the transistor Q10 is passed via diode D2 functioning essentially as a halfwave rectifier, to the charging circuit which comprises parallel connected resistor R27 and capacitor C13. The charging circuit is selected to have a relatively long time constant, approximately 0.1 second, and owing to such long time constant, intervals of silence are effectively bridged in the following manner.

The charging resistor R27 is returned to the −15 volt level, so that developed rectified positive voltage tends to discharge to the −15 volt level. Reference is made to the waveshape Q11B of FIGURE 2, which is an indication not only of the voltage conditions at the base of transistor Q11 but actually at the junction 27 of resistor R27 and capacitor C13. The rectified voltage developed at the junction 27 is transmitted to the base of transistor Q11 via a relatively high valued (1 megohm) resistor R29 to junction 28. From junction 28 a charging capacitor C14 is connected to ground. The capacitor C14 is selected to provide another relatively long time constant, and may be typically 1 microfarad. Thus, when pulses are transmitted by transistor Q8, charge is accumulated on capacitor C14 by virtue of the current pulses fed via line 26, diode D3 and resistor R30. The faster the pulse rate the greater the charge. The circuitry associated with the transistor Q11 for discharging capacitor C14 functions as follows, referring also to waveshape Q11B.

When a pulse of speech, as for example that designated by pulse 21, is applied to the system input, the capacitor C13 will charge to a peak such as 21C (Q11B) and thereafter will discharge towards −15 volts. As is shown in the waveshape Q11B the major peak 21 gives rise to a charging to the peak designated as 21C followed by an essentially straight line discharge (21C′) towards zero volts. In this instance, the zero volt level is not reached, because the occurrence of the major peak 22 causes a charging to the peak 22D in the waveshape Q11B, followed by another essentially straight line discharge designated as 22D′. In this instance, it is assumed that an interval of silence occurs so that the waveshape signal 22D′ indeed reaches zero volts and tends to discharge to −15 volts. As soon as the zero volt level is attained, the transistor Q11 is cut off and at the same time the diode D3 blocks. As a result, the capacitor C14 will hold its charge. As a matter of fact, the capacitor C14 is a high quality, low leakage capacitor capable of holding its charge for hours. In this manner, an integrated voltage is obtained at the junction 28 and is held at essentially constant value even during time intervals of silence. The described integrate and hold circuit bridges not only time intervals of silence but also bridges such unvoiced consonants as "s" or "th" which do not contain any periodic component of speech.

The integrated voltage available at the junction 28 is applied to the base of a field effect transistor Q12 which has an input impedance of the order of hundreds of megohms so as not to load the capacitor C14. The field effect transistor Q12 shunts the base collector circuit path of a final output transistor Q13, the other connection for the transistors Q12 and Q13 being as illustrated. The final output is obtained at the collector of transistor Q12 (output terminal 30).

Theoretical considerations, which have been verified experimentally in a working embodiment of the described circuit, indicate a linear relationship between output voltage at the terminal 30 and the pitch frequency.

From the foregoing, it is seen that there has been provided, in accordance with the invention, a pitch frequency detector capable of measuring the burst frequency of the human larynx with a linear relation frequency to output voltage. The concepts of the disclosed invention are useful for human identification purposes, especially so because of relative ease of classification by means of frequency. Experimental data indicate that speech sampled for as little as 2 seconds provides an adequate sample for establishing the pitch frequency with sufficient accuracy, and such a sample is substantially independent of the actual rate of speech.

The invention having been described by reference to a preferred embodiment thereof, there will now be obvious to those skilled in the art various modifications which do not essentially depart from the spirit of the invention as defined by the appended claims.

I claim:

1. In speech recognition apparatus, means for separating the major peak burst pulses attributable to the larynx from ringing and other unwanted signals inherent in the human voice, comprising input means for receiving the composite voice signal in electrical form, a peak detector coupled to the input means and comprising a signal amplifying means for operating at a limiting condition of current conduction such that there is delivered at its output only the signals exceeding a threshold amplitude, namely the desired major peak larynx burst pulses, integrating and hold circuitry which receives pulse type signals corresponding to the major peak larynx burst pulses and converts them to a direct current type signal related to their repetition rate, said integrating and hold circuitry including a relatively long time constant resistor-capacitor charging network, and a driver stage for the charging network comprising an amplifying means for operating at a condition of current conduction so as to supply the charging current for said charging network for only the duration of said pulse type signals but otherwise to cut off and hence to open the discharge path for the capacitor of said charging network, whereby the charge is held by said capacitor during time intervals of silence and during time intervals of unvoiced consonants.

2. Speech recognition apparatus according to claim 1, including a field effect transistor coupled to said capacitor of said charging network and providing a high input impedance to minimize discharge therethrough, said field effect transistor being included in the circuitry providing the direct current output signal related to the rate of larynx burst pulses.

3. In speech recognition apparatus, means for separating the major peak burst pulses attributable to the larynx from ringing and other unwanted signals inherent in the human voice, comprising input means for receiving the composite voice signal in electrical form, a peak detector coupled to the input means and comprising a signal amplifying means for operating at a limiting condition of current conduction such that there is delvered at its output only the signals exceeding a threshold amplitude, namely the desired major peak larynx burst pulses, integrating and hold circuitry which receives pulse type signals corresponding to the major peak larynx burst pulses and converts them to a direct current type signal related to their repetition rate, pulse shaping circuitry intermediate said peak detector and said integrating and hold circuitry, a pulse generator means for providing pulses of fixed duration at a repetition rate corresponding to that of the larynx burst pulses, the integrating and hold circuitry including a relatively long time constant resistor-capacitor charging network, and a driver stage for said charging network comprising an amplifying means for operating at a condition of current conduction so as to supply the charging current for said charging network for only the duration of said pulse type signals but otherwise to cut off and open the discharge path for the capacitor of said charging network, whereby the charge is held by said capacitor during time intervals of silence and during time intervals of unvoiced consonants.

4. Speech recognition apparatus according to claim 3, including a field effect transistor coupled to said capacitor of said charging network and providing a high input impedance to minimize discharge therethrough, said field effect transistor being included in the circuitry providing the direct current output signal related to the rate of larynx burst pulses.

5. Speech recognition apparatus according to claim 3, including a field effect transistor coupled to said capacitor of said charging network and providing the direct current output signal related to the rate of larynx burst pulses.

References Cited

UNITED STATES PATENTS

| | | |
|---|---|---|
| 3,381,091 | 4/1968 | Sondhi. |
| 3,197,560 | 7/1965 | Riesz. |
| 3,020,344 | 2/1962 | Prestigiacomo. |
| 2,872,517 | 2/1959 | Kalfaian. |
| 2,561,478 | 7/1957 | Mitchell. |

KATHLEEN H. CLAFFY, Primary Examiner

R. P. TAYLOR, Assistant Examiner